(No Model.) 2 Sheets—Sheet 1.
H. PERRIMAN & C. F. ALGER.
IMPLEMENT FOR STRAINING WIRE.
No. 405,796. Patented June 25, 1889.
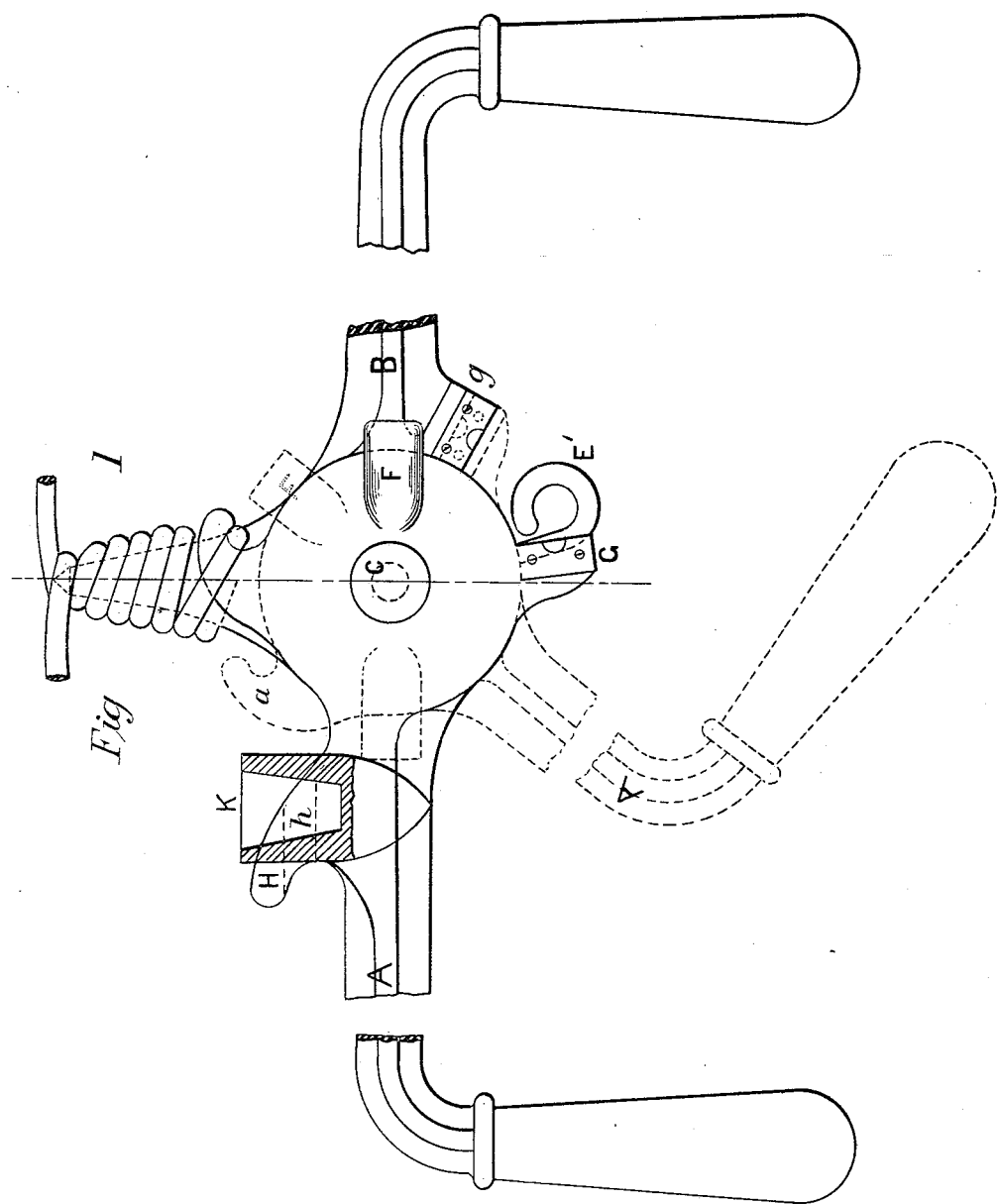

(No Model.) 2 Sheets—Sheet 2.
H. PERRIMAN & C. F. ALGER.
IMPLEMENT FOR STRAINING WIRE.
No. 405,796. Patented June 25, 1889.
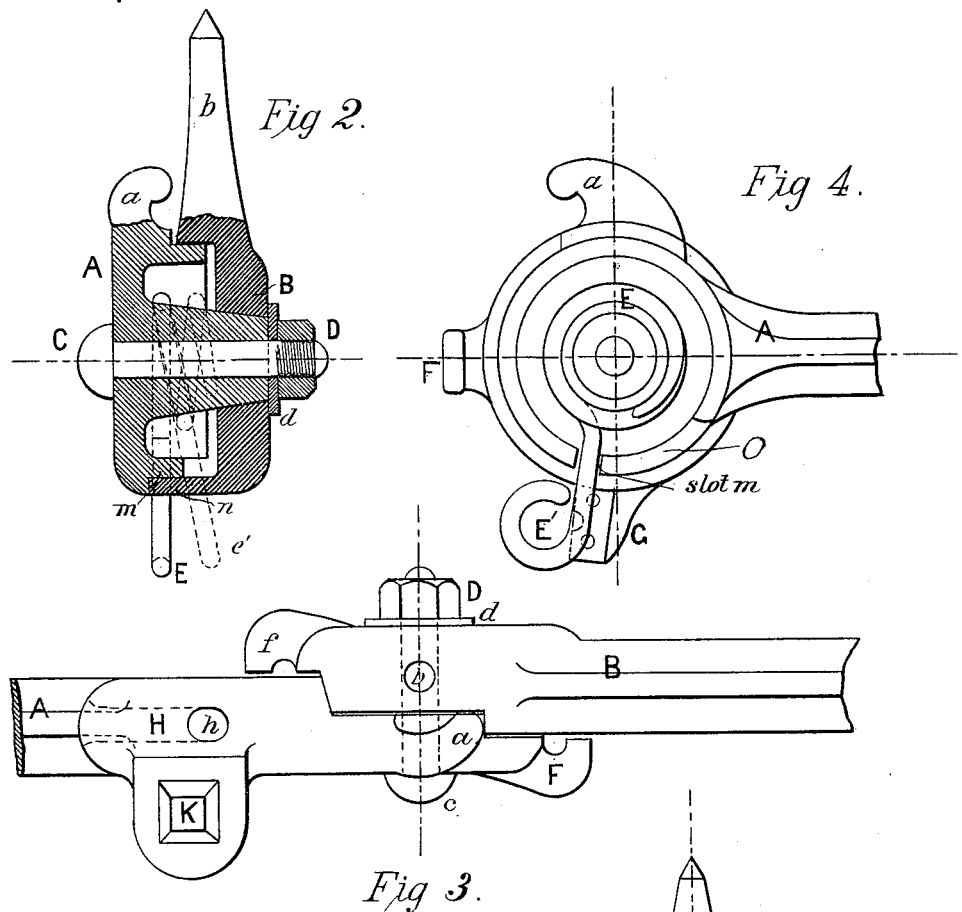
Witnesses 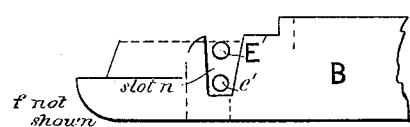 Inventors Henry Perriman, Charles Fred Alger.

UNITED STATES PATENT OFFICE.

HENRY PERRIMAN, OF ESSENDON, AND CHARLES FRED ALGER, OF MELBOURNE, VICTORIA.

IMPLEMENT FOR STRAINING WIRE.

SPECIFICATION forming part of Letters Patent No. 405,796, dated June 25, 1889.

Application filed June 21, 1888. Serial No. 277,851. (No model.) Patented in Victoria April 24, 1888, No. 5,781; in New Zealand April 25, 1888, No. 2,946; in Queensland April 27, 1888; in South Australia May 1, 1888, No. 1,014; in Tasmania May 19, 1888, No. 576, and in England June 7, 1888, No. 8,358.

*To all whom it may concern:*

Be it known that we, HENRY PERRIMAN, clerk, of Essendon, in the Colony of Victoria, and CHARLES FRED ALGER, engineer, of Mackenzie Street, Melbourne, also in the Colony of Victoria, have invented an Improved Implement for Straining Wire and other Cognate Purposes, (for which we have obtained the following Letters Patent: Great Britain, (provisional,) No. 8,358, June 7, 1888; Victoria, No. 5,781, April 24, 1888; South Australia, No. 1,014, May 1, 1888; New Zealand, No. 2,946, April 25, 1888; Tasmania, No. 576, May 19, 1888, and Queensland April 27, 1888,) of which the following is a full, clear, and exact description.

This invention consists of an implement for straining or tightening fencing, telegraph, and other wires at any point between the posts without leaving any part of the straining apparatus permanently upon the wires. It is used for tightening slack wires without cutting them, or for coupling two wires or the ends of a broken wire together and straining tight. Provision is made by special combination of parts for cutting wires, for forming loops and knots in the ends of wires when desired, and in some cases for holding auger-bits in the implement, so as to facilitate the boring of holes without its being necessary to employ a separate tool or auger.

To enable the invention to be fully understood, we will now proceed to describe the same by reference to the accompanying drawings, in which—

Figure 1 shows a side elevation, partly in section, of the implement, consisting of the two parts A and B joined or pivoted at C, and the part A is shown in the two extreme positions it assumes relatively to the part B by firm and dotted lines, respectively; Fig. 2, a transverse vertical section through the middle part of the implement; Fig. 3, a plan of part of the implement, including the middle part; Figs. 4 and 5, elevations of the inside construction of the parts A and B at the middle part of the implement; Figs. 6 and 7, plan views from beneath of the middle part aforesaid, which illustrate the operation of locking and unlocking the parts A and B on their pivot by the action of the spring E.

We prefer to use some suitable metal for the various parts, as iron and steel. The cutters G *g* we make of steel, and the spring E of steel or of drawn brass.

Similar letters refer to similar parts in all the figures.

Referring to Figs. 1, 2, and 3, the parts A and B are joined together by a screwed bolt C (which in some cases is cast, by preference, in the metal) and washer *d*, and secured by a nut D, but not so tightly as to prevent the parts A and B being turned on their pivot, when required, into the position represented by dotted lines for part A in Fig. 1.

Instead of the ordinary washer *d*, we sometimes prefer to substitute a spring-washer, for the purpose of so pressing A and B together at all times as to allow A to retain any intermediate position. It may be set in between the firm and the dotted lines in Fig. 1, instead of traveling freely from one extreme position into the other, as when we use a common washer.

*b* is a projecting tapering finger on the part B, and *a* is a projecting claw on the part A. The claw *a* is swelled at the top and set to approach close to *b*, so as to leave at that part barely sufficient or insufficient distance in the space between *a* and *b* for a wire to pass between; but the distance between the lower part of *a* and *b* is sufficient to allow one or two wires to be held between them in the straining process.

E is a spring which fills the interior space between A and B, and projects through corresponding slots *m* and *n* therein, respectively, to form a small outside handle E', as shown in the various figures.

By pressing the handle E', Fig. 2, toward the side of B it takes the position *e'* and leaves the slot *m* in A and enters the lower part of the corresponding slot *n* in B. These positions are illustrated in Figs. 6 and 7. When the handle is at *e'*, the parts A and B, previously locked together by the spring, are free to be moved on their pivot either to the extreme position of A (shown in Fig. 1) or any intermediate position when a spring-washer is used.

O is a longitudinal recess in A to leave room for the handle of the spring between A and B when that handle is not in the slot $m$. When the parts A and B are brought by the user back into line, the slot $m$ falls in line with $n$, and the spring E presses its handle from $e'$ to $E'$, and so locks the parts A and B in line, which is the position for straining.

F and $f$ are lugs on A and B, respectively, and have suitably-sized recesses, as shown, for holding wire between the lugs and the implement.

G and $g$ are steel cutters screwed or secured into suitable recesses or beds provided on the parts A and B, respectively, as shown, for cutting wire by the movement of the handles toward one another. We prefer to make slight recesses in the straight corresponding cutting-edges to grip the wire to be cut. We obtain unusually-powerful cutters in this manner without the cost and trouble of using a separate tool, and the steel cutting-bits, if injured, are easily removed and replaced.

In some cases we prefer to make the implement without adding cutters thereto or bosses for receiving them.

H is a lug having a hole $h$, running longitudinally through it, as shown, for passing wire through and facilitating the bending or looping of the same or making running knots. This device may take any other suitable position, as preferred. In some cases we prefer to make the implement without adding the lug H.

K is also a lug having a hole therein, as shown, for holding bits for boring, and is used in combination with the implement in some cases. By this device we save the trouble and cost of a separate auger, which would often be necessary otherwise. In some forms of the implement we do not add the lug K.

We use the wire strainer as follows: In tightening a slack wire the wire is let between $a$ and $b$, and looped on the former and then wound or coiled round and round the finger $b$, as shown in Fig. 1, the coiling being easily effected by rotating the machine by the handles on the finger $b$ as a center. According to the amount of slack to be taken up the coiling is regulated. The less the amount of slack and fewer coils required the nearer they will be formed to the point of the finger $b$, while the greater the amount the more turns will be required to be made round the thicker base, or the combined thickness of $a$ and $b$, before finishing at the point of $b$. In this way either large amounts, as several feet, or small amounts, as several inches, of slack wire can be taken up with facility in one tightening operation.

It will be evident that each coil upon the implement of the slack wire tightens the wire, and that when the point of $b$ is reached in the coil a fast knot has thus been formed, taking up the slack more or less, and putting more or less strain or tension on the straight parts of the wire to the particular extent preferred by the operator of the implement. It may be here said that it is not absolutely necessary to form the knot absolutely to the point of the tapering finger $b$. The coiling might be finished and the slack all removed in a lower position, and it will be found that a few such coils when released from the implement will, by the tension of the wire and their own strength, form a permanent knot.

When the knot is formed, the implement is disengaged from it by compressing the spring at $E'$ toward B and moving the handle of A toward B, so as to withdraw the claw $a$ from the loop of wire held by it.

When a spring-washer is used at $d$, instead of an ordinary washer, we secure the improved result of being able, after coiling a portion of wire on the finger $b$, to bring the claw $a$ partially back from its previous position and then tighten and strain the knot from the claw end by rotation of the handles of the implement, as before, thus perfecting the knot without subjecting the tense wire to further strain. This is more useful in knotting small amounts of slack.

To mend broken wires or otherwise join two wires, the two ends to be joined are passed in opposite directions through the space between $a$ and $b$, and between the lugs F $f$ and the body of the implement, respectively, and bent around, if desired, for stronger holding. The knot is then formed, as already described, by the rotation of the implement and by coiling the wire. The ends of the wires may then be freed from the implement and neatly removed by the cutters.

We wish our claims to be understood as extending to all modifications of our invention which are the equivalents of the combinations of parts herein specifically set forth for the purpose of illustrating a practical means for carrying our invention into effect.

Having thus fully described and explained the nature of our said invention and in what manner the same is to be performed, we declare that what we claim is—

1. In a wire-stretcher, the combination, with parts A and B, the former provided with claw $a$ and the latter with a tapering finger $b$, of screw-bolt C, serving as a pivot for said parts A and B, substantially as set forth.

2. In a wire-stretcher, the combination, with parts A and B, the former provided with claw $a$ and the latter with tapering finger $b$, of screw-bolt C, serving as a pivot for said parts A and B, and spring-washer $d$, substantially as set forth.

3. In a wire-stretcher, the part A, provided with claw $a$ and cutter G, and part B, provided with tapering finger $b$ and cutter $g$, in combination with pivot-screw C, upon which said parts A and B turn, substantially as set forth.

4. In a wire-stretcher, the parts A and B, the former recessed on the inside and provided with a hub which operates within a central opening in part B, in combination with spring E, arranged within the recess of part A, around its hub, and provided with a handle exterior of said parts A and B, substantially as set forth.

5. In a wire-stretcher, the part A, provided with claw $a$, and part B, provided with tapering finger $b$, the said part A also provided with a perforated lug H, in combination with pivot-bolt C, substantially as set forth.

6. The wire-stretcher consisting of parts A and B, having the hook $a$ and finger $b$, and bolt C, upon which said parts revolve, the said part A provided with a lug K, having a socket to receive an auger-bit therein, substantially as set forth.

In witness whereof we have hereunto set our hands in presence of two witnesses.

HENRY PERRIMAN.
CHARLES FRED ALGER.

Witnesses:
G. GARIBALDI TURRI,
JOHN KILEY.